United States Patent
Smith et al.

(10) Patent No.: US 10,368,226 B2
(45) Date of Patent: *Jul. 30, 2019

(54) METHOD OF UPDATING A LOCATION INFORMATION REPRESENTING A PHYSICAL LOCATION OF A COMMUNICATION DEVICE, A COMPUTER PROGRAM PRODUCT FOR EXECUTING THE METHOD, AND A COMMUNICATION SYSTEM FOR UPDATING THE LOCATION INFORMATION

(71) Applicant: Unify GmbH & Co. KG, Munich (DE)

(72) Inventors: James Smith, Nottingham (GB); Thomas Scharnagl, Perchtoldsdorf (AT)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,187

(22) Filed: Dec. 4, 2018

(65) Prior Publication Data

US 2019/0110184 A1 Apr. 11, 2019

Related U.S. Application Data

(63) Continuation of application No. 16/002,530, filed on Jun. 7, 2018, now Pat. No. 10,187,777, which is a
(Continued)

(30) Foreign Application Priority Data

| Jul. 18, 2012 | (WO) | PCT/EP2012/003035 |
| Jul. 25, 2012 | (WO) | PCT/EP2012/003148 |
| Aug. 21, 2012 | (WO) | PCT/EP2012/003543 |

(51) Int. Cl.
*G01S 5/00* (2006.01)
*H04W 4/90* (2018.01)
(Continued)

(52) U.S. Cl.
CPC ............ *H04W 4/90* (2018.02); *G01S 5/0027* (2013.01); *G01S 5/0054* (2013.01); *G01S 5/021* (2013.01);
(Continued)

(58) Field of Classification Search
CPC ......... H04W 4/90; H04W 4/029; H04W 4/02; H04W 4/027; H04W 4/20; H04W 60/04;
(Continued)

(56) References Cited

U.S. PATENT DOCUMENTS

| 7,551,931 B2 * | 6/2009 | Walczak | G01S 5/021 342/357.31 |
| 2002/0098851 A1 * | 7/2002 | Walczak | G01S 5/021 455/456.5 |

(Continued)

FOREIGN PATENT DOCUMENTS

| EP | 2063677 A1 | 5/2009 |
| KR | 1020040092579 A | 11/2004 |

(Continued)

OTHER PUBLICATIONS

James Polk Cisco Systems: "Session Initiation Protocol (SIP) Location Get Function; draft-polk-sip-location-get-00", Jul. 7, 2008, XP015059729, sections 2 und 4.

(Continued)

*Primary Examiner* — William Nealon
(74) *Attorney, Agent, or Firm* — Buchanan Ingersoll & Rooney PC (57) ABSTRACT

A method of updating a location information, which represents a physical location of a communication device (2), is generated by a location source (1), and sent from the location source (1) via a location object generating unit (1A, 2A) and a cache unit (3A) to a location consumer (4), comprises caching a first location information (6) in the
(Continued)

cache unit (3A), monitoring of a second location information (60) received subsequently to the first location information (6) at the location object generating unit (1A, 2A) by the location object generating unit (1A, 2A) to detect an invalid location information, and, triggered by the detection of an invalid location information (30, 50, 70), sending a location object (31, 51, 61, 71, 81) generated by the location object generating unit (1A, 2A) from the location object generating unit (1A, 2A) to the cache unit (3A), wherein the location object (31, 51, 61, 71, 81) comprises an invalidation information (85-88) indicating that a location information (6, 83) sent prior to the location object (31, 51, 61, 71, 81) is invalid such that, when the location object (31, 51, 61, 71, 81) is received at the cache unit (3A), the cached first location information (6) is discarded by the cache unit (3A).

19 Claims, 6 Drawing Sheets

Related U.S. Application Data continuation of application No. 15/840,297, filed on Dec. 13, 2017, now Pat. No. 10,021,553, which is a continuation of application No. 14/378,773, filed as application No. PCT/EP2013/000888 on Mar. 22, 2013, now Pat. No. 9,883,367.

(51) Int. Cl.
| | |
|---|---|
| *H04L 29/06* | (2006.01) |
| *G01S 5/02* | (2010.01) |
| *H04W 4/02* | (2018.01) |
| *G01S 19/34* | (2010.01) |
| *G01S 19/17* | (2010.01) |
| *H04L 29/08* | (2006.01) |
| *H04W 4/20* | (2018.01) |
| *H04W 76/50* | (2018.01) |
| *H04W 4/029* | (2018.01) |
| *H04W 60/04* | (2009.01) |

(52) U.S. Cl.
CPC .......... *G01S 5/0205* (2013.01); *G01S 5/0252* (2013.01); *G01S 19/17* (2013.01); *G01S 19/34* (2013.01); *H04L 65/105* (2013.01); *H04L 65/1006* (2013.01); *H04L 65/1069* (2013.01); *H04L 65/1073* (2013.01); *H04L 65/1083* (2013.01); *H04L 67/2852* (2013.01); *H04W 4/02* (2013.01); *H04W 4/027* (2013.01); *H04W 4/029* (2018.02); *H04W 4/20* (2013.01); *H04W 76/50* (2018.02); *H04W 60/04* (2013.01)

(58) Field of Classification Search
CPC .... H04W 76/50; G01S 5/0027; G01S 5/0054; G01S 5/021; G01S 5/0252; G01S 19/17; G01S 19/34; H04L 65/105; H04L 65/1006; H04L 65/1069; H04L 65/1073; H04L 65/1083; H04L 67/2852
USPC ........................................................ 455/404.2
See application file for complete search history.

(56) References Cited

U.S. PATENT DOCUMENTS

| | | | |
|---|---|---|---|
| 2003/0135486 | A1 | 7/2003 | Edlund et al. |
| 2005/0162309 | A1* | 7/2005 | Humphries ........... G01S 5/0027 342/357.31 |
| 2006/0135177 | A1* | 6/2006 | Winterbottom ......... H04W 8/16 455/456.1 |
| 2007/0211692 | A1* | 9/2007 | Boroski ............ H04L 29/06027 370/351 |
| 2008/0259908 | A1* | 10/2008 | Hines ................ H04L 29/12594 370/352 |
| 2009/0215427 | A1* | 8/2009 | Hawkins .............. H04M 3/5116 455/404.2 |
| 2010/0144272 | A1* | 6/2010 | Blight ....................... G01S 5/02 455/41.2 |
| 2010/0235279 | A1* | 9/2010 | Bouchard .............. G06Q 20/02 705/44 |
| 2010/0248683 | A1* | 9/2010 | Terpstra .................. H04W 4/90 455/404.2 |
| 2010/0304707 | A1* | 12/2010 | Bolin ....................... G01S 5/021 455/404.2 |
| 2011/0105125 | A1* | 5/2011 | Zhao ................ H04W 36/0055 455/436 |
| 2012/0295641 | A1* | 11/2012 | Tsuda ................. H04B 7/18547 455/456.6 |
| 2016/0084933 | A1* | 3/2016 | James ................ H04L 65/1006 342/450 |

FOREIGN PATENT DOCUMENTS

| | | |
|---|---|---|
| WO | 00/27284 A1 | 5/2000 |
| WO | 2006/130909 A1 | 12/2006 |
| WO | 2009151257 A2 | 12/2009 |

OTHER PUBLICATIONS

R. Mahy Individual et al.: RFC 6447: "Filtering Location Notifications in the Session Initiation Protocol (SIP)", Jan. 27, 2012, Seiten 1-19, sections 1 und 3, XP015081404.
J. Polk Cisco Systems et al.: RFC 6442: "Location Conveyance for the Session Initiation Protocol", Dec. 3, 2011, Seiten 1-35, section 3, XP015081370.
B. Rosen, NeuStar, J. Polk, Cisco Systems Best Current Practice for Communications Services in support of Emergency Calling draft-ieff-ecrit-phonebcp-20.txt, Sep. 7, 2011.
Written Opinion of the International Searching Authority for PCT/EP2013/000888 dated Aug. 5, 2013 (Form PCT/ISA/237).
International Search Report for PCT/EP2013/000888 dated Aug. 5, 2013 (Forms PCT/ISA/220, PCT/ISA/210).
Peterson, Neustar J., "A Presence-based Geoprov Location Object Format; rfc4119.txt" Dec. 1, 2005.

* cited by examiner

```xml
<?xml version="1.0" encoding="UTF-8"?>
<presence xmlns="urn:ietf:params:xml:ns:pidf"
    xmlns:gp="urn:ietf:params:xml:ns:pidf:geopriv10"
    xmlns:gbp="urn:ietf:params:xml:ns:pidf:geopriv10:basicPolicy"
    xmlns:ca="urn:ietf:params:xml:ns:pidf:geopriv10:civicAddr"
    entity="sip:12345@11.22.33.44">
  <tuple id="OS-0001232f59a8">
    <status>
      <gp:geopriv>
        <gp:location-info>  ~ 82
          <ca:civicAddress>
            <ca:country>DE</ca:country>
            <ca:A3>Munich</ca:A3>                         83
            <ca:HNO>51</ca:HNO>
            <ca:RD>Hofmannstraße</ca:RD>
            <ca:LOC>Room 100</ca:LOC>
            <ca:FLR>1</ca:FLR>
          </ca:civicAddress>
        </gp:location-info>  ~ 87          88
        <gp:usage-rules>
          <gp:retention-expiry>2011-12-19T14:01:29Z</gp:retention-expiry>
        </gp:usage-rules>
        <gp:method>LLDP-MED</gp:method>  ~ 84
      </gp:geopriv>
    </status>
    <timestamp>2011-12-19T14:01:29Z</timestamp>
  </tuple>         85                     86
</presence>
```

81

US 10,368,226 B2

METHOD OF UPDATING A LOCATION INFORMATION REPRESENTING A PHYSICAL LOCATION OF A COMMUNICATION DEVICE, A COMPUTER PROGRAM PRODUCT FOR EXECUTING THE METHOD, AND A COMMUNICATION SYSTEM FOR UPDATING THE LOCATION INFORMATION

CROSS-REFERENCE TO RELATED APPLICATIONS

This application is a continuation of U.S. patent application Ser. No. 16/002,530, which is a continuation of U.S. patent application Ser. No. 15/840,297, which is a continuation of U.S. patent application Ser. No. 14/378,773, which is the United States National Phase under 35 U.S.C. § 371 of PCT International Application No. PCT/EP2013/000888, filed on Mar. 22, 2013, and claiming priority to PCT International Application No. PCT/EP2012/003035, filed on Jul. 18, 2012; PCT International Application No. PCT/EP2012/003148, filed on Jul. 25, 2012; and PCT International Application No. PCT/EP2012/003543, filed on Aug. 21, 2012.

BACKGROUND OF THE INVENTION

Field of the Invention

Embodiments relate to methods of updating a location information, which represents a physical location of a communication device, which is generated by a location source, and which is sent from the location source via a location object generating unit and cache unit to a location consumer. Embodiments further relate to a computer program product for executing such a method and to a communication system for updating the location information.

BACKGROUND OF THE RELATED ART

As part of presence conveyance a location may be associated with a device and/or a user. The physical location of the device may be represented by a location information provided in an element of the device such as a communication device, e. g. a mobile or an IP phone. Presence conveyance may be an important issue in emergency cases: the location information may be used by emergency services such as NG911 (Next Generation 9-1-1) or NG112 (Next Generation 1-1-2) to locate the device that initiated an emergency communication request. Such a location information may be expressed as civic location, e. g. a postal address, and/or as geospatial coordinates, e. g. a map location. The physical location of the device is required in order for a telephony server to locate a suitable emergency services number to be used to place the call (routing). This number is obtained by interrogating a remote Location to Service translation server (LoST-server).

The standardization for NG911/NG112 requires the calling device, also called endpoint, to convey the actual physical location during an emergency call. The calling device is further required to contact a mapping service based on the latest location information in order to obtain routing information during start-up and immediately before the emergency call set-up, and to validate the latest location information to ensure that the provided physical location is a valid and existing civic address or map location during start-up and immediately before the emergency call set-up.

While obtaining the routing information is done via the LoST-server, validation is done via a Location Validation Function server (LVF-server) wherein the obtaining of the routing information and the validating of the latest location information may be done by the mapping service comprising the LoST-server and the LVF-server. If the endpoint fails to contact the mapping service in time before an emergency call, the endpoint must use cached data.

In case of network environments, where the endpoint, which may be in the form of a SIP endpoint contacts the mapping service via a server, which may be in a form of a SIP-server, the server contacts the mapping service on behalf of the registered endpoint. Updating the location information cached by the server and/or by the endpoint may be achieved by conveying the physical location of the endpoint to the server periodically to keep the server updated before an emergency call is set up. For periodically updating the location information cached by the server and/or by the device, a viable location source is required. Occasionally, the location source may be considered not to be viable. For example:
- the location source does not respond to enquiries of the server and/or of the device,
- the location source does not send information in a timely manner, for example within a periodic time interval,
- the location source declares itself to not be viable,
- the location source provides a null location which is not a valid location information,
- the location source ceases to provide location information, and
- the location source provides an unrealistic location.

In the case of a not viable location source delivering not valid location information, one way of improving the accuracy of the location information is to attach an expiration date to the conveyed location information. The expiration time may be computed and associated with a location report received from a tracked entity as disclosed in US 2003/0135486 A1. An analysis of a history of previous location reports, here, is utilized to estimate the relevance of future location reports over time. By using the computed expiration time, an expiration time value acts as a threshold that controls the shape of a relevance degradation curve of a location report. In KR 20040092579, a method for correcting a location estimation error of a user equipment in a CDMA (Code Division Multiple Access) system is described, wherein an accurate location of a user terminal is estimated by correcting a location estimation error generated by a repeater. If a Base Transceiver Station (BTS) receives a message of an access channel for location registration of a user equipment from a core network, the BTS detects timing when the message of the random access channel is received, adds repeater pass path information to the message of the random access channel, and transmits the message to a Base Station Controller (BSC). The BTS searches for a repeater pass path of a signal received from the user equipment by using a stored message. The BSC estimates the location of the user equipment by using the retrieved repeater pass path information and error information of the repeater.

While this prior art addresses the accuracy of future location information based on stored location information presumed to be viable, these location estimate methods fail if the cached location information, on which the estimated location is based, is itself not viable or not valid.

BRIEF SUMMARY OF THE INVENTION

Embodiments may provide an update of cached location information with an improved localization accuracy if subsequent to the caching of the location information a location source of the location information becomes not viable. The method of updating location information, which represents a physical location of a communication device, is generated by a location source, and sent from the location source via a location object generating unit and a cache unit to a location consumer, comprises caching a first location information in the cache unit, monitoring of a second location information received subsequently to the first location information at the location object generating unit by the location object generating unit to detect an invalid location information, and, triggered by the detection of an invalid location information, sending a location object generated by the location object generating unit from the location object generating unit to the cache unit, wherein the location object comprises an invalidation information indicating that a location information sent prior to the location object is invalid such that, when the location information is received at the cache unit, the cached first location information is discarded by the cache unit.

BRIEF DESCRIPTION OF THE FIGURES

Embodiments and advantages of the invention are highlighted in the following with respect to figures. For an improved clearness, the figures are not true to scale or proportionate. In the figures, as long as not mentioned otherwise, same references indicate same parts with same meaning. It illustrates.

DETAILED DESCRIPTION OF THE INVENTION

We provide a method of updating location information, which represents a physical location of a communication device, is generated by a location source, and sent from the location source via a location object generating unit and a cache unit to a location consumer, comprises caching a first location information in the cache unit, monitoring of a second location information received subsequently to the first location information at the location object generating unit by the location object generating unit to detect an invalid location information, and, triggered by the detection of an invalid location information, sending a location object generated by the location object generating unit from the location object generating unit to the cache unit, wherein the location object comprises an invalidation information indicating that a location information sent prior to the location object is invalid such that, when the location information is received at the cache unit, the cached first location information is discarded by the cache unit.

The location information may be a value or a set of values related to a civic location or geospatial coordinates of a physical location. The civic location may be a postal address, wherein the geospatial coordinates may define a map location. While the first location information may be a civic location, the second location information may be geospatial coordinates or vice versa. The communication device may be a mobile or stationary unit capable of sending and/or receiving data over a communication connection. For example, the communication device may be a mobile phone, an IP phone, a Personal Digital Assistant, a tablet PC, a laptop or the like. The communication device may also be a stationary unit such as a desktop PC or a server. While each of these units is stationary by itself, it still may be movable by being operated for example on a car, boat, ship, bus, airplane or any other movable vessel.

The location source may be a GPS (Global Positioning System) sensor, a triangulation device and/or unit processing a position from several received signals which have been received at a single device from several wireless stations, respectively. The location source may also be a centralized data base which has stored civic addresses for multiple wired devices. In an office building, the civic address may be in the form of information about the building, a floor, and a room, e. g. building number, floor number, and room number. Thus, in network environments, the location source may be a location server. The location object generating unit may be comprised by the communication device whose location information is generated by the location source. Alternatively, the location object generating unit may be comprised by the location source itself. The cache unit may be comprised by a server, conveying the location information from the location source to the location consumer. Alternatively, the cache unit may be comprised by the communication device itself.

The location consumer may be the communication device or another device to which the location information is conveyed for providing location-based services. If a navigation system is to be used in a mobile phone or smart phone comprising a GPS sensor, the location source in form of the GPS sensor, the location object generating unit, and the cache unit are comprised by the communication device, which is the location consumer as well. In a distributed system which is the case often in network environments, the location source may be external to the communication device and embodied for example in a centralized location/localization server. In NG911/NG112, the communication device may be the endpoint, for example a SIP endpoint, a unit for the mapping service may be the location consumer and the server contacting the mapping service on behalf of the registered endpoint may comprise the cache unit. If the communication device is connected to the location source, the location object generating unit would be comprised by the communication device, and, if the location source would be connected to the server, the location object generating unit would be comprised by the location source. The location information is cached on behalf of the communication device by the server that acts as a proxy for location conveyance to the location consumer. If, after a location information has been cached by the server, the location source becomes not viable/valid, the (proxy) server should be informed so that the server can determine if a previously cached location information is likely to still be representative or, if this is not the case, an alternative location source to the location source should be sought by the server.

If the cache unit would be comprised by the location consumer, the consumer should as well be informed of a not viable location source in order to determine if the cached location information is still representative of the physical location of the communication device or not. By monitoring of location information received subsequently to the cached location information by the location object generating unit and detecting an invalid location information, the location object generating unit is able to determine whether the location source is viable/valid or not. By monitoring the location information, the location object generating unit is able to detect the invalid location information without or with little delay. Invalid location information may not only be false location information, but also non-location information if location information is expected from the location object generating unit. If there is a time interval within location information is to be received lapses without receiving location information, the detected location information is regarded invalid.

Triggered by the detection of the invalid location information, the location object generating unit sends a generated location object to the cache unit wherein the location object comprises an invalidation information which indicates that the location information sent prior to the location object is invalid. By sending the invalidation information from the location object generating unit to the cache unit, the server and/or location consumer and/or the communication device, which comprises the cache unit, respectively, is informed that a cached location information received prior to the location object is invalid, such that, when the location object is received at the cache unit, the cached location information is discarded. While the known standards for location conveyance do not consider the case when a previously conveyed location information is to be considered as being no longer valid, with the exception of attaching an expiration information to the conveyed location information, the cached location information would be regarded valid by the cache unit even though location information received after caching the location information would be discarded. With the invention, however, the validity of cached location information is addressed when subsequently to the caching of the information the location source has to be considered not viable due to sending of invalid location information.

Independent of the reason of invalidation of the second location information, the location object generating unit as the generator of the location object informs the cache unit which provides the location information to the location consumer for executing location-based services, with the necessary invalidation information for the cache unit to discard the cached first information as being invalid location information. In contrast to an expiration information, the invalidation information comprises an invalidation information relating not to the location information sent with the location object but to location information sent prior to the location object. Therefore, the invalidation information allows the cache unit the conclusion that with a not viable location source sending invalid location information, cached location information sent prior to the location source becoming not viable, should be discarded since it is not secured that the cached location information is still valid.

The location object may comprise a retention-expiry element indicating that, if a time value of the retention-expiry element has passed when the cache unit receives the location object, the cache unit discards the location object, and a timestamp element indicating a value of time when the location object is generated, and wherein the invalidation information is formed by setting the time value of the retention-expiry element to be equal or earlier than the value of time of the timestamp element. The retention-expiry element and the timestamp element may be set by the location object generating unit or by a unit comprising the location object generating unit such as the communication device or the location source.

In the standard RFC 4119 (Request For Comments 4119) a retention-expiry element as a field to a PIDF-LO (Presence Information Data Format-Location Object) document that conveys the location information, is defined with regard to its use as: if the value in the retention-expiry element has already passed when the Location Recipient receives the Location Object, the Recipient MUST discard the Location Object immediately. The location object, which is sent as a PIDF-LO according to the standard RFC 4119, additionally to the retention-expiry element contains a timestamp element indicating the time when the PIDF-LO document was created/generated. By setting the value of the retention-expiry element to be equal or earlier than the timestamp element/field, the device is effectively declaring that the location information is effectively invalid for the cache unit and must be discarded, even if the location information is held in the cache unit as cache location information received previously to the PIDF-LO document. While some standards specifying the conveyance of location information may not consider the case when a location information conveyed previously to a point in time when the location source has to be considered to be not viable, is to be considered as being no longer valid, the IETF standardization according to RFC 4119 can be used by setting the time value of the retention-expiry element to be equal or earlier than the value of time of the timestamp element to illustrate the inventive approach to invalidate the previously conveyed location information. A data type for the retention-expiry element according to RFC 4119 is specified in the W3C (World Wide Web Consortium) schema definition. The formal definition of the format of the retention-expiry element is <xs:element name="retention-expiry" type="xs:date-Time"minOccurs="0" maxOccurs="1"/>, wherein "xs:dateTime" is defined in the W3C schema. No other type of format for the retention-expiry element is allowed according to RFC 4119. While according to the definition of the retention-expiry element according to RFC 4119 it is possible to achieve the desired effect of sending the invalidation information indicating that the location information sent prior to the location object is invalid then the value of the retention-expiry element is set later than the value of the timestamp as long as the PIDF-LO document is received at the cache unit before the point in time set with the value of the retention-expiry element. However, according to the invention the value of time of the timestamp element is relevant rather than the point in time of receipt of the PIDF-LO at the cache unit.

In another embodiment, the location object comprises the invalidation information in an invalidation information field indicating by single value such as a flag, whether the location information sent prior to the location object is invalid or not. The single value may be set to zero indicating invalid location information. Alternatively, a flag could be set such that a set flag indicates invalid location information.

In another embodiment, the location object comprises the location information sent prior to the location object from the location object generating unit to the cache unit in a form readable by the cache unit to enable the cache unit to confirm that the cached first location information is the location information to be discarded. The location object may comprise the location information sent prior to the location object from the location object generating unit to the cache unit in a location-info element distinguishing the location information sent prior to the location object from the invalidation information. The location-info element according to RFC 4119 may be used for containing the location information sent to the cache unit prior to the location object to allow the cache unit or a larger unit comprising the cache unit such as a server or the location consumer or the communication device to confirm the cached location that is to be discarded.

With the inclusion of the location information sent prior to the location object in the location object the cache unit is enabled to confirm the cached location information to be discarded. If the cached location information differs from the location information sent prior to the location object and being comprised by the location object, the cache unit or the larger unit comprising the cache unit may request the location object generating unit to repeat the sending of the location object comprising the invalidation information. Before receiving another location object comprising invalidation information, the cached location information may not be discarded.

The invalid location information may be detected as a result of the location source
  not responding to enquiries of an enquiring unit, such as the communication device, the location object generating unit, the cache unit, the location consumer, or another unit enquiring location information of the communication device,
  not sending the location information in a timely manner, specially within a value of the time interval predetermined by the enquiring unit
  declaring itself to not be viable,
  providing as the location information a null location,
  ceasing to provide the location information, or
  providing an unrealistic location information.

Another form of location information being regarded by a skilled person as invalid location information may be an information sent from the location source to the location object generating unit that the location source is not viable. It is also possible that a manual misconfiguration of a location/localization server is regarded invalid location information by the location object generating unit. By sending the invalidation information triggered by the detection of the invalid location information from the location object generating unit to the cache unit, the cached first location information is caused to be discarded, which fulfills the inventive ability to allow the location source of the communication device to declare that the location source has become invalid and any location information provided prior to the point in time when the location source became invalid should not be used.

In another embodiment, if the detection of the invalid location information by the location object generating unit ends, a third location information received subsequently to the second location information at the location object generating unit is cached in the cache unit. Therefore, when the location object generating unit no longer sends location objects comprising the invalidation information, the cache unit resumes caching location information to be able to provide the location consumer with location information for executing location-based services.

A cache controlling unit may be coupled to the cache unit and may be at least partially comprised by the communication device, a server acting as a proxy for location conveyance to the location consumer, or by the location consumer. Both, the cache controlling unit and the cache unit may be comprised by the communication device, the server, or by the location consumer. A cache controlling unit distributed over the communication device, the server, and the location consumer or at least two of these entities is possible. The cache controlling unit may comprise the cache unit.

If the cached first location information is discarded by the cache unit, the cache controlling unit instead of receiving the location information from the location source via the location object generating unit, may receive the location information from an alternative location source to the location source, the alternative location source being internal or external to the cache controlling unit. As the location source, the alternative location source may be internal in form of an extension to LLDP called LLDP-MED (Link Layer Discovery Protocol-Media Endpoint Devices), DHCP (Dynamic Host Configuration Protocol), enterprise server, manual means, etc. External forms of the alternative location source (or the location source) include GPS, network-calculated location information, etc.

In another embodiment, the reception of the location information from the location source is switched by the cache controlling unit to the reception of the location information from the alternative location source such that during switching the location consumer is supplied with the location information without signaling a malfunction. Due to the monitoring of the second location information and sending of the location object comprising the invalidation information triggered by the detection of the invalid location information by the location object generating unit, the cache controlling unit is enabled to switch from the not viable location source to a viable alternative location source quickly enough such that during the switching the location consumer can be supplied with continuous location information without signaling a malfunction.

A computer program product for executing the inventive method as outlined above may be provided. The computer program product may be a software product comprising instructions. The computer program product may be comprised by a machine readable medium wherein the machine readable medium may be a floppy disk, a CD (Compact Disc), a DVD (Digital Versatile Disc), or any other suitable digital or analogue medium.

The invention further comprises a communication system for updating a location information, which represents a physical location of a communication device, is generated by a location source, and sent from the location source via location object generating unit and a cache unit to a location consumer. The communication system comprises the caching unit configured to cache a first location information in the cache unit, and the location object generating unit configured to monitor a second location information received subsequently to the first location information at the location object generating unit to detect an invalid location information, wherein the communication system is configured such that, triggered by the detection of an invalid location information, a location object generated by the location object generating unit is sent from the location object generating unit to the cache unit, wherein the location object comprises an invalidation information indicating that a location information sent prior to the location object is invalid such that when the location object is received at the cache unit, the cached first location information is discarded by the cache unit.

The communication device may be a mobile phone, a wired phone, such as an office phone, a PDA (Personal Digital Assistant), a PC (Personal Computer), a tablet PC or any other communication device comprising the apparatus features as outlined above. The first location information and/or the second location information may be provided by location sources such as a DHCP supporting server/switch, an LLDP-MED supporting LAN (Local Area Network), server/switch or an external configuration management system. LLDP-MED—as mentioned above—is an enhancement of LLDP. LLDP-MED has been registered by the Internet Assigned Numbers Authority (IANA) as a valid value of a method element as defined by RFC 4119 as an optional "method" element describing the way a location information is derived or discovered. The location source may provide a manually configured value for a location information and/or comprise a GPS sensor or a base station processing several signal strengths of signals of the communication device received by several receiving units being located at different positions from each other. An internal (LLDP-MED, DHCP, enterprise server, manual means, etc.) or an external location source (GPS, network calculated location information, etc.) is thus possible.

In an embodiment of the communication system, the location object is configured to comprise a retention-expiry element indicating that, if a time value of the retention-expiry element has passed, then the cache unit receives the location object, the cache unit discards the location object, and a timestamp element indicating a value of time when the location object is generated, wherein the retention-expiry element and the timestamp element are configured such that the time value of the retention-expiry element is set to be equal or earlier than the value of time of the timestamp element to form the invalidation information.

Figure 1A:
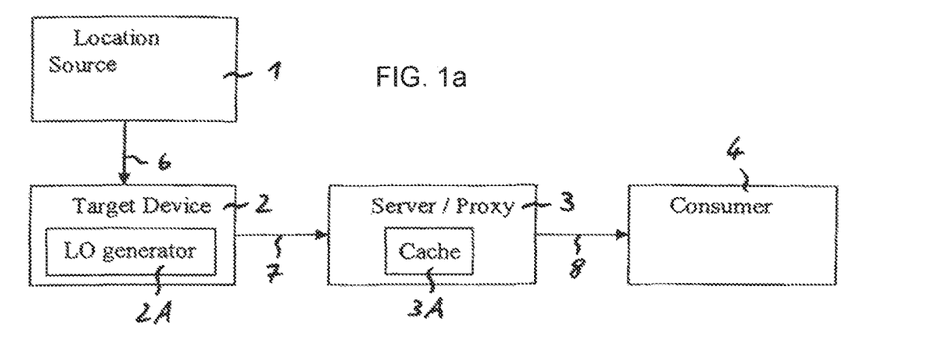
FIG. 1a a schematic location conveyance system according to the invention, wherein the location source is coupled to the communication device which is coupled to the server, FIG. 1b a schematic location conveyance system according to the invention in another embodiment, wherein, in addition to the location conveyance system of FIG. 1a, an alternative location source is coupled to the server, FIG. 2 a schematic location conveyance system according to the invention in another embodiment, wherein the location source is coupled to the server, FIG. 3a a schematic flow of messages from the location source to the communication device to the server comprising the cache unit to the location consumer, FIG. 3b a schematic flow of messages according to the invention in another embodiment, wherein, in addition to FIG. 3a, an alternative location source is replacing the location source, FIG. 4 a schematic flow of messages according to the invention in another embodiment, wherein the location source is comprised by a location server comprising the location object generating unit, FIG. 5 a schematic flow of messages according to the invention in another embodiment, wherein, after discarding cached location information, the caching of location information resumes based on valid location information from the location source, and FIG. 6 a location object comprising a retention-expiry element and a timestamp element according to the invention.

In FIG. 1a, a location source 1, for example in the form of a GPS sensor in a layer 2 switch (data link layer according to the OSI-7-Layer Model (Open Systems Interconnection Reference Model) is connected to a communication device 2 called target device, having a physical location which is represented by location information 6 provided by the location source 1. The location information 6 may be in any format or be in form of data to calculate the location information from. The communication device 2 comprises a location object generating unit, called LO generator, 2A which generates/creates a location object, e.g. a PIDF-LO, 7, which is sent from the communication device 2 to a server 3 comprising a cache unit, called cache, 3A. The server 3 comprises a cache controlling unit (not shown) which is coupled to the cache unit 3A for controlling the cache unit 3A.

The location object 7 comprises a timestamp and a retention-expiry element, wherein a time value of the retention-expiry element is set to be equal or earlier than a value of time of the timestamp element since the location information 6 has been detected to be no longer valid by the location object generating unit 2A. The location object 7 may comprise a timestamp and a retention-expiry element, wherein a time value of the retention-expiry element is set to be equal or earlier than a value of time of the timestamp element should the location information 6 be detected to be no longer valid by the location object generating unit 2A. Triggered by the detection of the invalid location information the location object 7 comprises an invalidation information indicating that a location information sent prior to the location object 7 to the cache unit 3A comprised by the server 3, such that, when the location object is received at the cache unit 3A, cached location information in the cache unit 3A is discarded by the cache unit 3A.

The server 3 acts as a proxy for location conveyance to a location consumer 4 which is coupled to the server 3 such that the server 3 provides location information 8 to the location consumer 4 if the server 3 is enquired to by the location consumer 4. The server 3 may cache the location information in the cache 3A to find a route for calls subsequent to a registration of the communication device 2 at the server 3. For example, a mapping service may be provided by the server 3 on behalf of a registered communication device 2 in form of a SIP endpoint, wherein the location consumer 4 is the communication device 2 enquiring the server for mapping based on a latest location information in order to obtain routing information during start-up and immediately before the communication device 2 setting up an emergency call. As the server 3, the location consumer may as well cache the location information received. The PIDF-LO may comprise location information generated by the location source 1 to be cached in the cache unit 3A of the server 3.

Figure 1B:
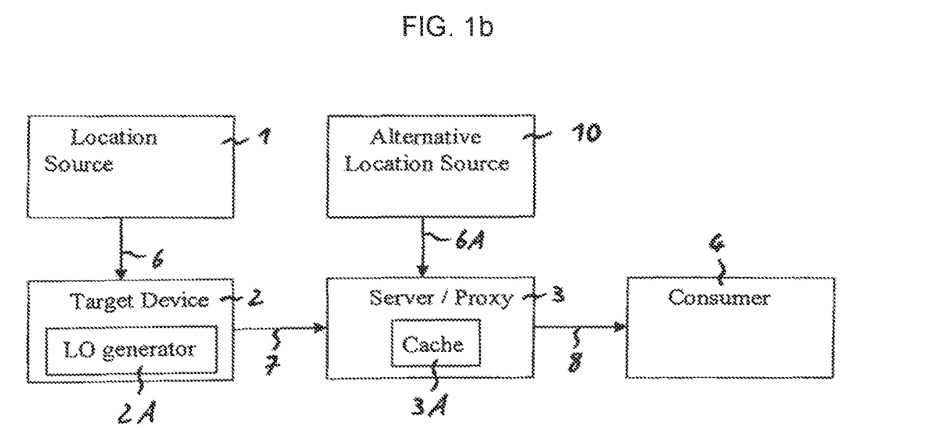

In FIG. 1b, a schematic arrangement of a location conveyance system of FIG. 1a is extended by an alternative location source 10 which is coupled to the server 3 comprising the cache controlling unit and sends second location information 6A to the server 3 which discarded cached location information in the cache unit 3A, because a location object comprising invalidation information 7 has been sent from the communication device 2 to the server 3 triggered by the detection of invalid location information from the location source 1. The alternative source 10 may be a location server that stores location information for several or all communication devices of a network (not shown).

The location information 6A sent from the alternative location source 10 to the server 3 may be configured manually and may therefore be less reliable than the location information 6 of the primary location source 1, which may determine location information automatically. The alternative location source 10 therefore acts as a backup location source for the location source 1 only in cases where the location source 1 becomes not viable/reliable which is indicated by the location object 7 comprising invalidation information which indicates that the location information 6 sent prior to the location object is invalid such that when the location object is received at the cache unit 3A, the cached location information in the cache unit 3A is discarded by the cache unit 3A. As a consequence, instead of location information 6 from the location source 1, location information 6A from the alternative location source 10 is conveyed to the location consumer 4.

Figure 2:
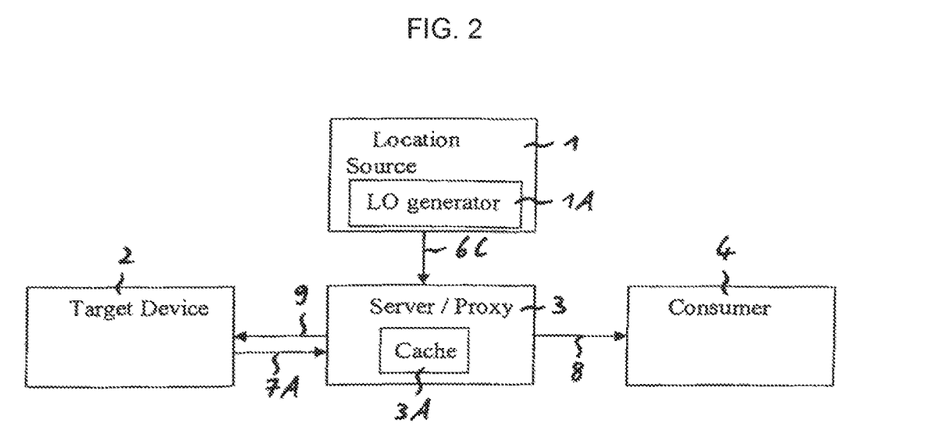

In FIG. 2, another location conveyance system according to the invention is configured such that the location source 1 comprising a location object generating unit 1A is connected to the server 3, which comprises the cache controlling unit, and sends the location object comprising invalidation information to the server 3 in the case, where invalid location information has been detected by the location object generating unit 1A which monitors location information received from the location source 1. The reception of the location information from the location source 1 at the location object generating unit 1A occurs internally of the location source 1. With the location source generating the inventive location object 6C which comprises an invalidation information in the case of detecting invalid location information, the location source 1 may be in the form of a central location server that provides the server 3 directly with location information conveyed by location objects. The server 3 may inform the communication device 2 about location information received by the location source 1. The server 3 may inform the communication device 2 if the location information of the location source 1 has become invalid (see arrow 9 in FIG. 2). Based on the received information that the location source 1 has become invalid, the communication device 2 may send an information 7A to the server 3, which uses the cached location information in the cache 3A to provide location information 8 to the location consumer 4.

Figure 3A:
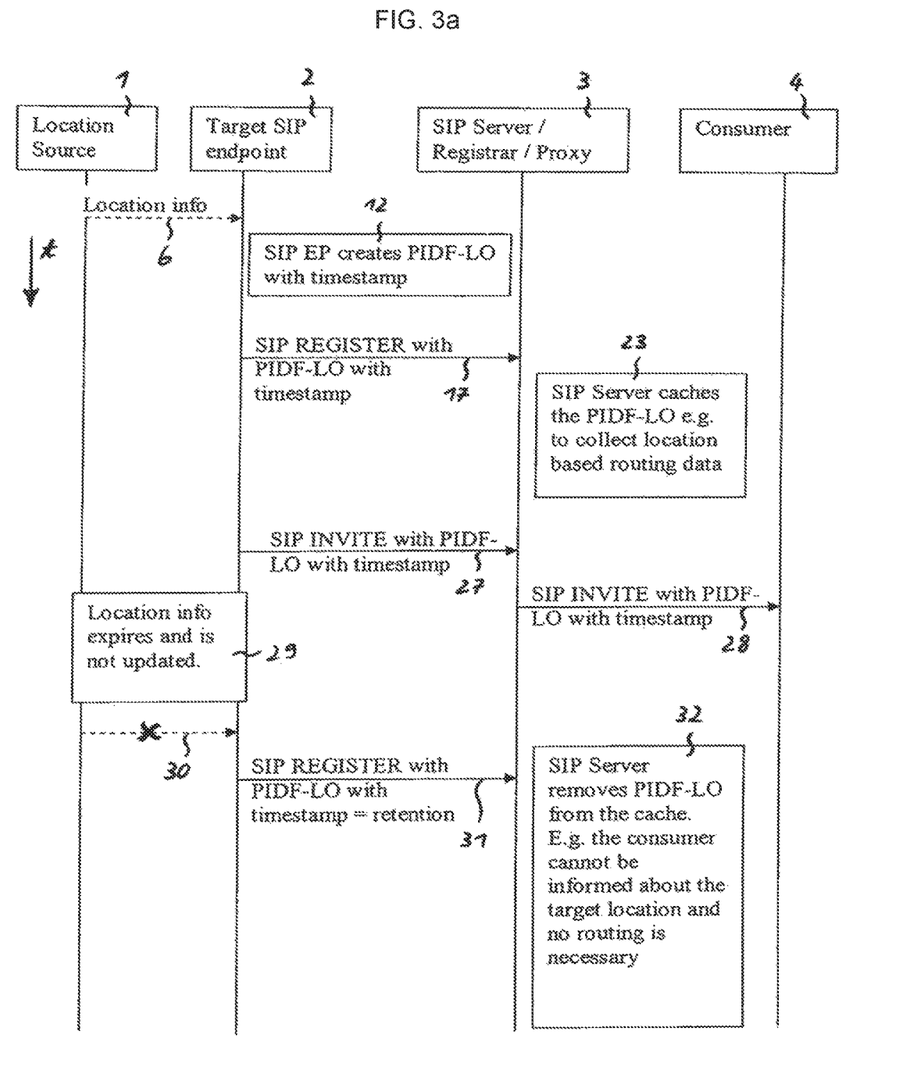

In FIG. 3a, first embodiment of a schematic flow of messages according to the invention between the location source 1, the communication device 2, the server 3 comprising the cache unit and the cache controlling unit, and the location consumer 4 is depicted. The communication device 2 is embodied as a SIP endpoint while the server 3 is in the form of a SIP-server acting as a proxy for location conveyance to the location consumer 4. According to the downward arrow "t" the messages between the location source 1, the SIP endpoint 2, the SIP-server 3, and the location consumer 4 are exchanged from top to bottom on a time scale. In a first message a location information 6 is provided from the location source to the SIP endpoint 2, which obtains the location information 6. For registering the SIP endpoint 2 at the SIP-server 3, the SIP endpoint 2 creates a PIDF-LO document comprising valid location information.

The SIP endpoint 2 conveys the PIDF-LO document to the SIP-server 3 in a SIP register request comprising the PIDF-LO with a timestamp, 17. The SIP-server 3 may cache the PIDF-LO, e. g. in order to collect location-based routing data necessary to route a call of the SIP endpoint 2 to the location consumer 4, 23. By sending a SIP invite request message from the SIP endpoint 2 to the server 3, 27, wherein the SIP invite message comprises a PIDF-LO with a timestamp, the SIP endpoint 2 sets up a call with a PIDF-LO comprising valid location information 6. The server 3 forwards the call requested by the SIP endpoint 2 at the server 3 to the location consumer 4 by using the cached PIDF-LO for routing. For forwarding the call, the SIP-server 3 sends a SIP invite request message with a PIDF-LO comprising valid location information 6 with a timestamp 28, to the location consumer 4. Subsequently to the registration of the SIP endpoint 2 at the SIP-server 3, the location information expires and is not updated, 29. As a consequence, no location information is sent from the location source 1 to the SIP endpoint 2, 30. The missing location information, 30, of the location source 1 is detected at the SIP endpoint 2 as invalid location information. Triggered by the detection of the invalid location information from the location source 1, the SIP endpoint 2 generates a location object in form of a PIDF-LO wherein a timestamp element of the location object and a retention-expiry element are comprised by the location object.

A value of time of the timestamp is set to be equal to a value of time of the retention-expiry element, 31. In a next SIP register message, the SIP endpoint 2 sends the PIDF-LO comprising invalidation information which indicates that a location information sent prior to the location object is invalid to the SIP-server 3. When the location object comprising the invalidation information is received at a cache unit comprised by the SIP-server 3, the SIP-server is not only prevented to cache the PIDF-LO, but the cache unit of the SIP-server discards the location information cached in the cache unit in form of the PIDF-LO received in the initial SIP register request message, 17. As a result of the discarded cached location information, location-based routing is not possible unless the SIP endpoint 2 provides another PIDF-LO comprising valid location information, 32.

Figure 3B:
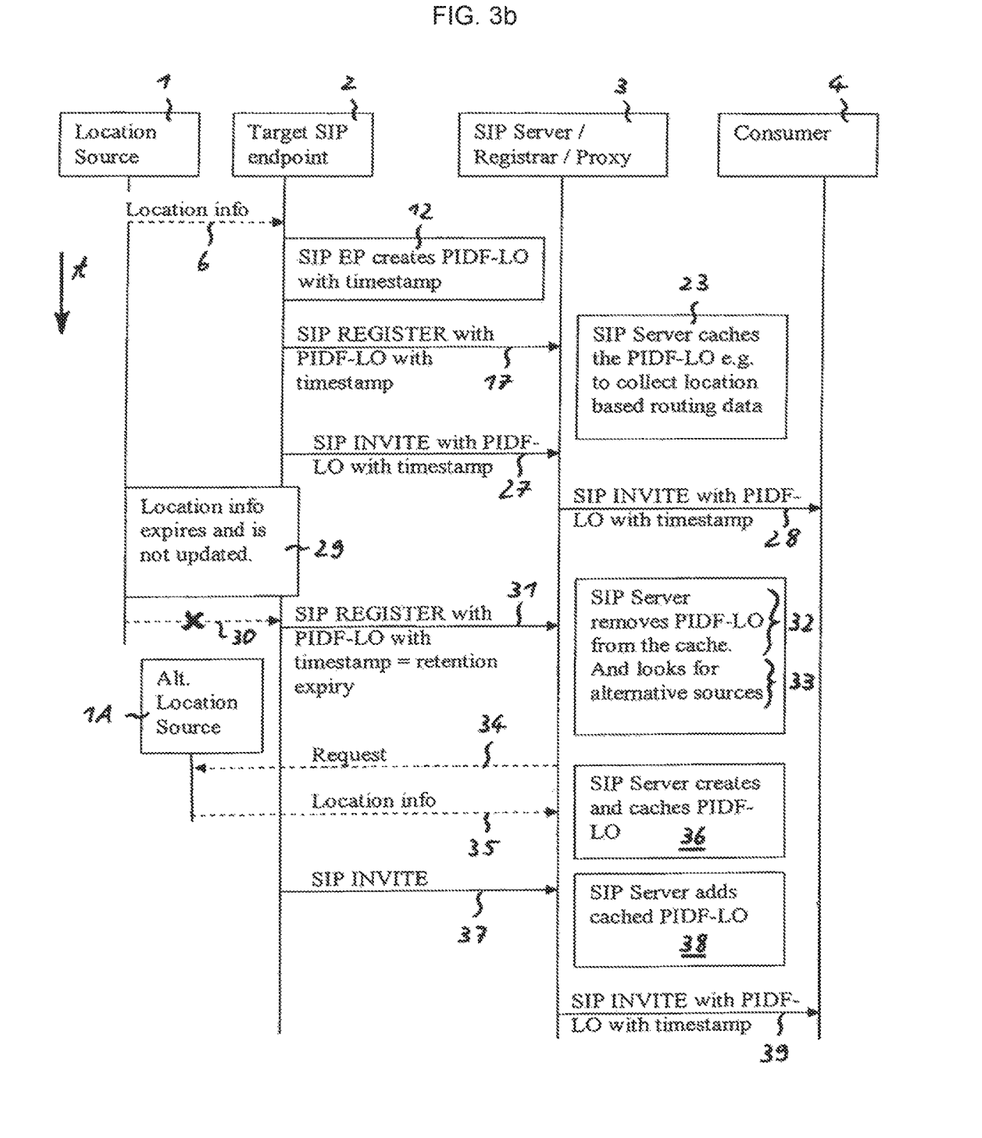

In FIG. 3b, in addition to the message flow of FIG. 3a, the SIP-server 3, which comprises the cache unit and the cache controlling unit (not shown), contacts an alternative location source 1A replacing the location source 1. As the SIP-server 3 is informed by the SIP endpoint 2 with the SIP register request message, 31, comprising a PIDF-LO with a timestamp and retention-expiry element, respectively, set to an equal value of time, the SIP-server 3 not only discards the cached location information 6 in its cache but removes the PIDF-LO comprising the location information from the cache, 32. Instead of being unable to route a call from the SIP endpoint 2 to the location consumer 4, the SIP-server 3 looks for alternative location sources, 33.

Triggered by the location object comprising the invalidation information indicating that a location information sent prior to the location object is invalid, 31, the server 3 contacts the alternative location source 1A by sending a request message 34 from the SIP-server 3 to the alternative location source 1A. The alternative location source 1A may be a location server that has stored preconfigured location information which is more coarse, e.g. localization tolerance +/−10 m instead of +/−3 m for the location source 1, or less reliable, e.g. an update time interval of 1 day instead of 1 hour for the location source 1, than the location information 6 of the location source 1. As the alternative location source 1A is able to provide valid location information, 35, to the SIP-server 3, the SIP-server 3 creates and caches a PIDF-LO comprising valid location information 35, 36. When the SIP endpoint 2 sets up a call by sending a SIP invite request message, 37, to the SIP-server 3, the SIP-server 3 has valid location information cached in its cache to add the cached PIDF-LO either to a SIP invite message of the server 3 to the location consumer 4 in response to the received SIP invite message, 37, or to the SIP invite message, 37, from the SIP endpoint 2 for forwarding to the location consumer 4, 38.

As a result of the valid location information, 37, from the alternative location source 1A, the SIP-server 3 is able to send a SIP invite request message to the location consumer 4 for routing the call requested by the SIP endpoint 2 with the SIP invite message 37 based on the location information 35 of the SIP endpoint 2. The PIDF-LO sent with the SIP invite 39 from the server 3 to the location consumer 4 comprises valid location information 35 so that the call can be forwarded. When the location information forwarded with the SIP invite 39 from the SIP-server 3 to the location consumer 4 becomes invalid, the SIP-server 3 may inform the location consumer 4 about the PIDF-LO received by the location consumer 4 to become invalid if the location customer has stored a PIDF-LO which is not the case in NG911 scenarios.

Figure 4:
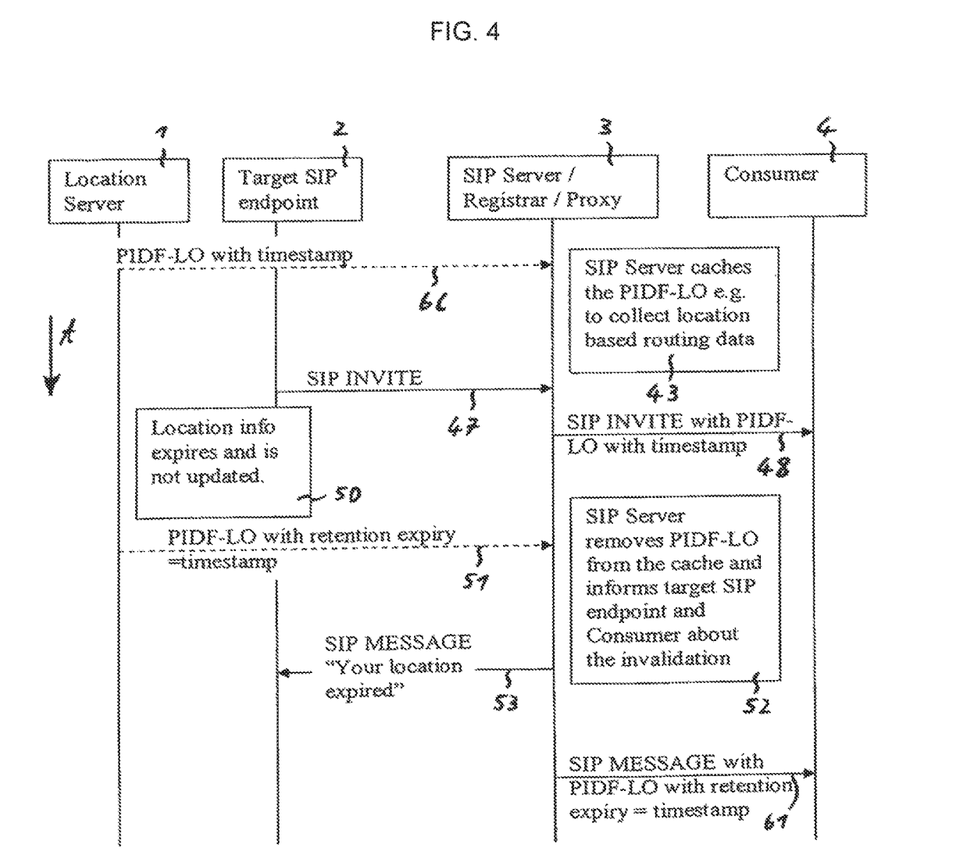

In the schematic flow of messages of FIG. 4 the location source 1 is embodied as a location server sending a PIDF-LO with a timestamp 6C to the SIP-server 3 without an involvement of the communication device 2 in form of a SIP endpoint. The SIP-server 3 again comprises the cache unit and the cache controlling unit and obtains the PIDF-LO with location and timestamp information of the SIP endpoint 2 from the location server which may be a central location server. The SIP-server 3 caches/stores the PIDF-LO received from the location source 1 for example to collect location-based routing data, 43.

By sending a SIP invite message 47 to the SIP-server 3, the SIP endpoint 2 sets up a call to be forwarded by the SIP-server 3 to the location consumer 4. The SIP-server 3 inserts the stored PIDF-LO from its cache in a SIP invite request message 48 comprising a PIDF-LO with the stored location information for routing the call requested by the SIP endpoint 2 to the location consumer 4 based on the location information provided by the location server 1. Subsequently to the SIP invite message 48 sent from the SIP-server 3 to the location consumer 4, the location information expires and is not updated, 50. The location server 1 invalidates the PIDF-LO by setting a value of time of a retention expiry element equal to a value of time of a timestamp comprised by the PIDF-LO, 51.

The location source 1 in form of the location server may calculate the location information of the SIP endpoint 2 by using information from a network infrastructure. Invalidation of the location information sent from the location source 1 to the SIP-server 3 may be caused by missing network data. Invalidation of the location information from the location source 1 may also be caused by location information that is mistyped by an administration authority. When the PIDF-LO is received at the cache unit of the SIP-server 3, the cached location information is removed by the SIP-server 3 by removing the PIDF-LO 6C from the cache 34. The SIP-server 3 informs the SIP endpoint 2 and may inform the location consumer 4 about the invalidation of its cached location information, 52. The SIP endpoint 2 is informed by a SIP message "Your location expired" 53 that is sent from the SIP-server 3 to the SIP endpoint 2 that its location information has expired and is not valid anymore. If the location consumer 4 has stored location information, the location consumer 4 is informed about the invalidation of its location information due to the invalidation of the location information of the SIP endpoint 2 by the SIP-server 3 by another SIP message 61 wherein this SIP message comprises a PIDF-LO with a value of time of a retention-expiry element being set equal to a value of time of a timestamp comprised by the PIDF-LO, 61.

The SIP message 51 or 61 each comprising the information of the about the invalidation of the location information of the SIP endpoint 2 is a message beyond the messages conventionally being exchanged within a SIP call. Other protocols like HTTP (Hypertext Transfer Protocol) or SNMP (Simple Network Management Protocol) or other protocols may be chosen instead of the Session Initiation Protocol used by the SIP endpoint 2 and the SIP-server 3 to exchange messages for executing the inventive method. At least the message that the location information 6C sent prior to the location object 51 is invalid may be exchanged via such a protocol other than SIP.

Figure 5:
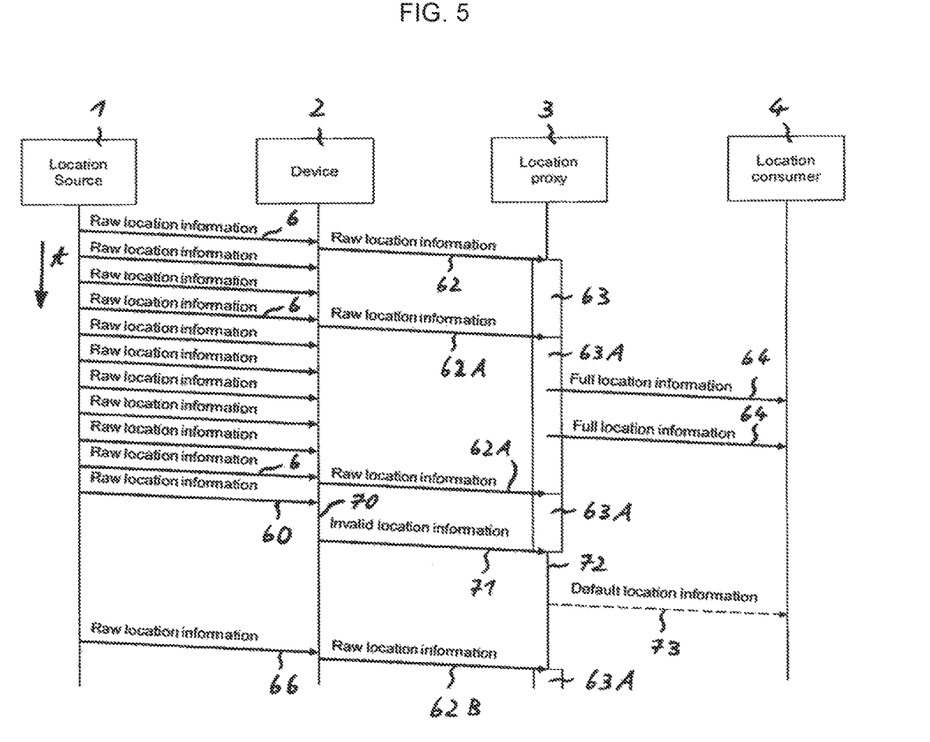

In FIG. 5 a schematic flow of messages in another embodiment of the invention between the location source 1, the communication device 2, the server 3 comprising a cache unit and cache controlling unit, and the location consumer 4 as arranged in the location conveyance system of FIG. 1a is shown. The location source 1 provides raw location information 6 of the communication device 2 to the communication device 2. Raw location information is defined as any location information that with or without processing allows the communication device 2 to determine its physical location. The raw location information 6 may be sent for instance as a PIDF-LO, in a data structure of a PIDF-LO, or in any other data format suitable for conveyance.

The communication device 2 that needs to convey its location to the location consumer 4 receives the initial raw location information 6 and sends this raw location information 6 to the server 3 acting as a proxy for a location conveyance to the location consumer 4, 62. The server 3, called location proxy as the server 3 acts as a proxy for the location consumer 4, completes the raw location information 6 by adding a timestamp to the raw location information 6 and caches the completed raw location information as a location object in the cache unit of the server 3, 63. As the communication device 2 detects a change in the raw location information 6 sent from the location source 1 to the communication device 2, the communication device 2 sends this changed raw location information 6 representing a changed physical location of the communication device 2 to the server 3, 62A. By sending the changed raw location information 6 to the server 3, the cached location information in the cache unit of the server 3 is updated. The server 3 completes the new/changed raw location information 6 by adding a timestamp and caches this new/changed raw location information 6 in its cache unit as the actual physical location of the communication device 2, 63A.

Afterwards, the server 3 detects a condition where the location of the communication device 2 needs to be sent to the location consumer 4, 64. As the raw location information 6 did not change after the completed location information has been sent from the server 3 to the location consumer 4, the server 3 detects another condition where the physical location of the communication device 2 needs to be sent to the location consumer 4, 64, and therefore sends the same completed location information cached in its cache unit to the location consumer 4, 64 which has been sent before to the location consumer 4 (see timeline indicated by the arrow t). Afterwards, the communication device 2 once again detects a change in the raw location information 6 and updates the location information cached in the cache of the server 3, 62A, by sending the changed raw location information from the communication device 2 to the server 3. As occurred before, the server 3 completes the new/changed raw location information 6 by adding a timestamp and stores the new/changed raw location information 6 as a location object in its cache unit, 63A.

Afterwards, the communication device 2 detects that the raw location information 60—in contrast to the raw location information 6—from the location source 1 is no longer valid, 70, and updates the server 3 by sending a location object comprising an invalidation information indicating that the location information 6 sent prior to the location object is invalid to the server 3 for updating the cached location information 6 of the server 3, 71. The location object sent from the communication device 2 to the server 3, 71, is received at the cache unit of the server 3 wherein the cached location information 6 is discarded by the cache unit of the server 3. As a result, the server 3 will not use the location information 6 that it has stored/cached for the communication device 2 and instead uses a default location information for the communication device 2 that is stored in the cache unit, 72.

Afterwards, the server 3 detects a further condition where the physical location of the communication device 2 needs to be sent to the location consumer 4 and sends (only) the default location information to the location consumer 4 instead of the previously cached completed location information 6, 73. Although the default location information may be less accurate as the previously cached full location information 6 at the time of caching, the server 3 uses the default location information as the cached full location information 6 is considered to be not viable/valid. The default location information is considered a valid location information and therefore sent to the location consumer 4 by the server 3. Afterwards, another raw location information 66 from the location source 1 is detected by the communication device 2 as valid raw location information and therefore sent as raw location information from the communication device 2 to the server 3 as an update of the cached default location information, 62B. The server 3 considers the raw location information 66 as valid location information and therefore completes the new/changed raw location information 66 by adding a timestamp and stores/caches the new/changed raw location information 66 as a location object in its cache unit, 63A.

Other embodiments than that shown in FIG. 5 are possible: for example, the location source 1 may not repeatedly provide raw location information 6. The communication device 2 may be able to complete the raw location information by adding a timestamp rather than leaving the completion of the raw information 6 as a task for the server 3 (see FIG. 1b). The communication device may detect a condition when the location consumer 4 requires the location of the communication device 2 and the communication device 2 may provide the condition to the server 3. However, if the server 3 needs to complete the raw location information 6 from the communication device 2 by adding a timestamp for time critical condition then the server 3 may instead of completing the (actual) raw location information from the communication device 2 still choose to use the already cached location information for forwarding to the location consumer 4 even though this cached location information may be of a previous date than the raw location information the server 3 is able to receive from the communication device 2.

As the already cached location information in the server 3 is used, a transfer time of the raw location information from the communication device 2 to the server 3 and a processing time for completing this raw location information 6 by at least adding a timestamp is saved. The server may push the completed location information to the location consumer 4 but other implementation may allow the location consumer 4 to pull the completed location information from the server 3. The communication device 2 may not push the location information to the server 3 but other implementations may allow the server 3 to pull the location information from the communication device 2 instead. The location source is shown in FIG. 5 to push the location information to the communication device 2 but other implementation may allow the communication device 2 to pull the location information from the location source 1. In some implementations, the communication device 2 may have direct access to the location consumer 4. In these implementations, the server 3 acting as a proxy for the location consumer 4 on behalf of the communication device 2 is not required.

Figure 6:
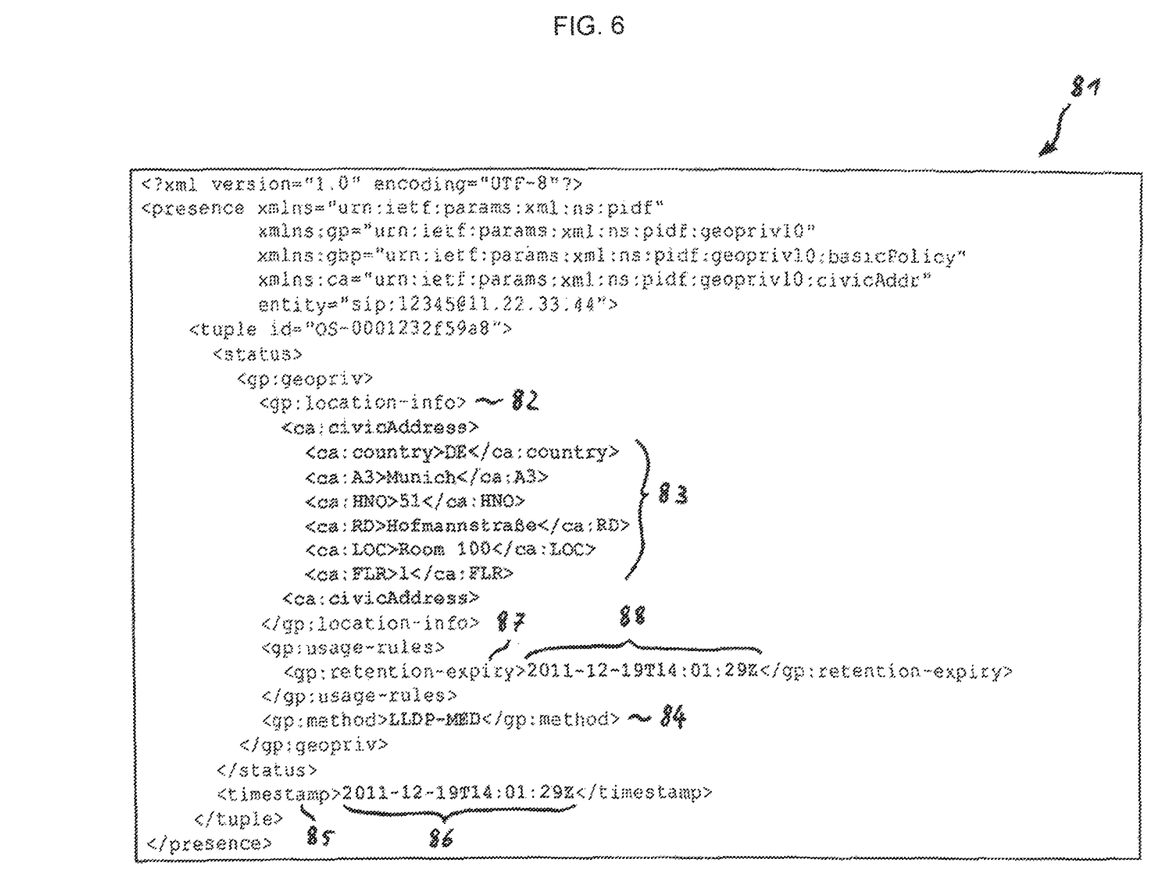

In FIG. 6 an embodiment of the inventive location object 81 comprising an invalidation information 85 to 88 indicating that a location information 83 sent prior to the location object 81 is invalid is shown. The location object 81 comprises a location-info-element/field 82 comprising a civic address as the physical location of the communication device 2 sent prior to the location object 81 from the location object generating unit to the cache unit, 83. The location information 83 is readable by the cache unit to enable the cache unit to confirm that the cached location information is the location information to be discarded as a result of the reception of the location object 81. The location-info-element 82 is distinguished from the invalidation information 85 to 88. Therefore, the location-info-element distinguishes the location information 83 sent prior to the location object 81 from the invalidation information 85 to 88.

The invalidation information 85 to 88 is embodied as a retention-expiry element 87 according to the standard RFC 4119 comprising date and time information 88 according to this standard. The date and time information 88 constitutes a time value of the retention-expiry element 87. The invalidation information 85 to 88 comprises further a timestamp element 85 indicating a value of time 86 when the location object 81 is generated. By setting the time value 88 of the retention-expiry element 87 to be equal—as is the case in FIG. 6—or earlier than the value of time 86 of the timestamp element 85, it is indicated that a location information sent prior to the location object 81 is invalid such that when the location object 81 is received at the cache unit, the cached location information is discarded by the cache unit. The location-info element 82 therefore comprises the last provided location information 83 to assist the server/location consumer/communication device to confirm that a previously cached version of the location information 83 should be discarded. The location object 81 also indicates the source of the location information 83 in a "method" element, 84, that no longer provides valid location information. In FIG. 6, this source of invalid location information is "LLDP-MED" as comprised by the "method" element. The location source LLDP-MED may become not viable when it ceases to advertise to the communication device a LID TLV which is a Location Identification Type/Length/Value according to the ANSI-TIA 1057-2006 LLDP-MED specification. When the LLDP-MED ceases to advertise the LID TLV the Time To Live for the TLV expires and the server/communication device/location consumer is no longer able to trust the previously advertised value of the TLV. In other embodiments of the location object, the location information 83 to be discarded may be missing. Any format of the invalidation information indicating that a location information sent prior to the location object is invalid such that, when the location object is received at the cache unit, the cached location information is discarded by the cache unit, may serve as a location object according to the invention.

A technical feature or several technical features which has/have been disclosed with respect to a single or several embodiments discussed herein before, e. g. the alternative location source 10 in FIG. 1b may be present also in another embodiment e. g. the location conveyance systems depicted in FIG. 1a and/or FIG. 2, respectively, except it is/they are specified not to be present or it is impossible for it/them to be present for technical reasons.

What is claimed is:

1. A method of updating location information, said location information representing a physical location of a communication device, wherein said location information is generated by a location source, and wherein said location information is sent from the location source to an electronic device having hardware comprising a processor, the method comprising:

monitoring a second location information received subsequently to a first location information by the electronic device to detect an invalid location information included in the second location information, and, in response to detection of the invalid location information, sending invalidation information indicating that location information of the first location information is invalid so that the first location information is discarded by non-transitory computer readable medium storing the first location information in response to the invalid location information.

2. The method of claim 1, wherein the invalidation information comprises:
a retention-expiry element indicating that, if a time value of the retention-expiry element has passed when the non-transitory computer readable medium receives the invalidation information, the non-transitory computer readable medium discards the invalidation information, and
a timestamp element indicating a value of time when the invalidation information is generated, and wherein the invalidation information is formed by setting the time value of the retention-expiry element to be equal or earlier than the value of time of the timestamp element.

3. The method of claim 2, wherein:
the invalidation information comprises a location object that contains the invalidation information in an invalidation information field indicating by a single value whether the location information sent prior to the location object is invalid.

4. The method of claim 1, wherein:
the invalidation information comprises the location information sent prior to invalidation information to the non-transitory computer readable medium in a form readable by the non-transitory computer readable medium to enable the non-transitory computer readable medium to confirm that the first location information is the location information to be discarded.

5. The method of claim 1, wherein:
the invalidation information comprises the location information sent to the non-transitory computer readable medium in a location-info element distinguishing the location information sent prior to the invalidation information from the invalidation information.

6. The method of claim 1, wherein the invalid location information is detected as a result of a condition selected from the group consisting of:
the location source not responding to enquiries of at least one member of the group consisting of the communication device, a location object generating unit, the non-transitory computer readable medium, and the electronic device,
the location source not sending the location information within a value of a time interval predetermined by an enquiring unit,
the location source declaring itself to not be viable,
providing as the location information a null location,
the location source ceasing to provide the location information, and
the location source providing an unrealistic location information.

7. The method of claim 1, comprising:
caching in the non-transitory computer readable medium, a third location information received subsequently to the second location information when detection of the invalid location information ends.

8. The method of claim 1, wherein a controlling unit is coupled to the non-transitory computer readable medium, and wherein the controlling unit is at least one member of the group consisting of part of the electronic device, and a server acting as a proxy for location conveyance to the electronic device.

9. The method of claim 8, comprising:
the controlling unit receiving location information from an alternative location source internal or external to the controlling unit after the first location information is discarded in response to the detection of the invalid location information identified in the second location information.

10. The method of claim 9, comprising:
switching, by the controlling unit, reception of the location information from the location source to reception of location information from the alternative location source.

11. A non-transitory machine readable medium having a computer program stored thereon such that an electronic device performs a method defined by the computer program when a processor of the electronic device runs the computer program, the method comprising:
monitoring a second location information received subsequently to a first location information at the electronic device to detect an invalid location information included in the second location information, and,
upon detection of the invalid location information included in the second location information, sending invalidation information indicating that location information of the first location information is invalid so that the first location information is discarded by non-transitory computer readable medium storing the first location information.

12. A communication apparatus for updating a location information that represents a physical location of a communication device generated by a location source, the communication apparatus comprising:
a processor connected to a non-transitory computer readable medium, the communication apparatus configured to monitor a second location information received subsequently to first location information to detect invalid location information included in the second location information, and
the communication apparatus configured so that, upon detection of the invalid location information included in the second location information, the communication apparatus sends invalidation information indicating that location information of the first location information is invalid so that the first location information is discarded.

13. The communication apparatus of claim 12, wherein a location object generating unit is configured to generate a location object that includes the invalidation information, the location object generating unit comprising a component of the communication device or a component of the location source.

14. The communication apparatus of claim 13, comprising:
the non-transitory computer readable medium that stores the first location information.

15. The communication apparatus of claim 12, wherein the communication apparatus is configured to generate a location object, the location object comprising:
a retention-expiry element indicating that, if a time value of the retention-expiry element has passed when a cache unit receives the location object the cache unit discards the location object, and
a timestamp element indicating a value of time when the location object is generated.

16. The communication apparatus of claim 15 wherein the retention-expiry element and the timestamp element are configured such that the time value of the retention-expiry element is set to be equal or earlier than the value of time of the timestamp element to form the invalidation information.

17. The communication apparatus of claim 12, wherein the communication apparatus is configured to generate a location object, the location object comprising:
- a retention-expiry element indicating that, if a time value of the retention-expiry element has passed when the location object is received, the location object is to be discarded, and
- a timestamp element indicating a value of time when the location object is generated; and
- wherein the retention-expiry element and the timestamp element are configured such that the time value of the retention-expiry element is set to be equal or earlier than the value of time of the timestamp element to form the invalidation information.

18. The communication apparatus of claim 12, wherein the communication apparatus is a mobile phone, a telephone device, a tablet personal computer, a laptop computer, a desktop computer, or a personal digital assistant.

19. The communication apparatus of claim 12, wherein the communication apparatus is a machine selected from the group consisting of a computer device and a server.

* * * * *